Figure 1:
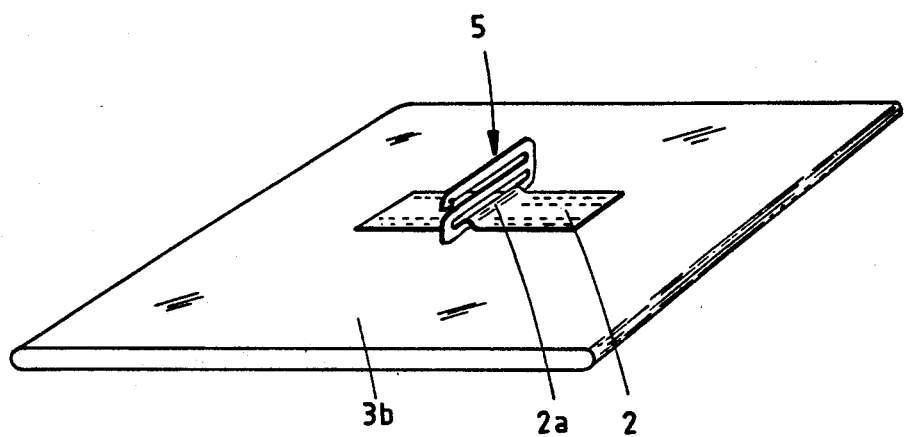

United States Patent [19]

Korneliussen

[11] Patent Number: 5,257,854
[45] Date of Patent: Nov. 2, 1993

[54] DEVICE FOR USE WITH A SAFETY BELT

[76] Inventor: Kjell Korneliussen, Munkerekkveien 120, N-3142 Vestskogen, Norway

[21] Appl. No.: 721,488
[22] PCT Filed: Feb. 1, 1990
[86] PCT No.: PCT/NO90/00026
§ 371 Date: Jul. 1, 1991
§ 102(e) Date: Jul. 1, 1991
[87] PCT Pub. No.: WO90/08676
PCT Pub. Date: Aug. 9, 1990

[30] Foreign Application Priority Data

Feb. 3, 1989 [NO] Norway .................................. 890435

[51] Int. Cl.$^5$ ............................................. A47C 31/00
[52] U.S. Cl. ....................................... 297/468; 297/467
[58] Field of Search ............... 297/464, 462, 468, 485, 297/483, 484, 487, 488, 4; 280/801

[56] References Cited

U.S. PATENT DOCUMENTS

| | | | |
|---|---|---|---|
| 928,305 | 7/1909 | Carrington | 297/467 |
| 3,275,373 | 9/1966 | Card | 297/467 |
| 3,694,029 | 9/1972 | Noble et al. | 297/467 |
| 4,874,203 | 10/1989 | Henley | 297/464 X |
| 5,005,865 | 4/1991 | Kruse | 297/467 |

FOREIGN PATENT DOCUMENTS 2491311  4/1982  France .................................. 297/4

Primary Examiner—Laurie K. Cranmer
Attorney, Agent, or Firm—Young & Thompson

[57] ABSTRACT

A device for use with a safety belt (8), e.g. a three-point safety belt, and a seat in a car to prevent the transverse belt (8a) of safety belt (8), which in a normal position lies in loose contact across the user's thighs, from sliding up to and pressing against the user's abdomen in case of abrupt braking or a possible car clash, in which case it might injure internal organs, especially the womb and foetus of pregnant women. The transverse belt (8a) is releasably fastened to a connector (5), which is fastened between the user's thighs to a sitting support (3). Sitting support (3) may consist of the seat portion (3a) of the car seat.

8 Claims, 4 Drawing Sheets

DEVICE FOR USE WITH A SAFETY BELT

The present invention relates to a device for use with a safety belt, e.g. a three-point seat belt, and a seat in a car to prevent the transverse portion, transverse belt, which in a normal position lies in loose contact across the user's thighs, from sliding up onto and exerting pressure against the user's abdomen in case of abrupt braking, or a car crash, which might result in injuries to the user's internal organs, especially the womb and foetus of pregnant women, or to any external auxiliary organs carried by stomi-operated persons.

Use of a safety belt reduces the number of serious injuries and deaths in connection with car accidents. This is also the with pregnant women, but the transverse portion or transverse belt often causes injuries, like placental separation, ruptured uterus, or direct injury to the foetus-especially the spine of the foetus. This is due to the fact that the transverse belt, which in a normal position lies loosely across the user's thighs, will slide up and exert pressure against the user's abdomen in connection with abrupt braking or a car crash.

In "Tidsskrift for Den norske laegeforening" (Journal of the Norwegian Medical Association) No. 24, 1986, pp 1921-1923 among others, a demand for an improved safety belt arrangement as compared to those previously known, which will also protect the womb of pregnant women, is expressed.

Other persons with special anatomic conditions rendering use of the conventional safety belt system difficult, may also derive benefit from a further development of a safety belt, in which the above mentioned facts are taken into account. We have especially In mind persons with ileostomi, colostomi, ureterostomi, as well as rather obese persons, etc.

It is, thus, an object of the present invention to provide a safety belt the transverse belt portion of which will not slide up onto and exert pressure against the user's abdomen during abrupt braking or in case of a car crash, but is firmly held across the user's thighs.

By releasably fastening the transverse belt on a connecting means which is, in turn, secured to a sitting support and is in use situated between the user's thighs, the transverse belt will in case of an abrupt reduction of speed be tightened across the user's thighs without sliding up onto the user's abdomen, and the diagonal belt portion of the safety belt will at the same time prevent the upper part of the user's body from moving forward.

Said sitting support may in an embodiment of the Invention consist of the seat portion of the car seat, and in another embodiment it may consist of a flat flexible seat cushion to be loosely provided on the seat portion of the car seat. In said two embodiments the connecting means Is fastened to the seat portion of the car seat proper, or to said loose flexible cushion, respectively.

In the first mentioned case the connecting means and, thus, the transverse belt is fastened to the car seat proper, which prevents the transversal belt from moving in case of abrupt braking or a car crash. In the second case it is the user's weight on the flexible seat cushion which will cause the transverse belt to be firmly held in conditions as mentioned above. In this case the seat cushion is also provided with a fastening strap, which extends from both rear corners of the seat cushion and is intended to extend behind the car seat back to prevent the seat cushion from sliding forwards on the seat.

The sitting support and the connecting means may be designed in various manners, as will appear from the above mentioned dependent claims.

Figure 2:
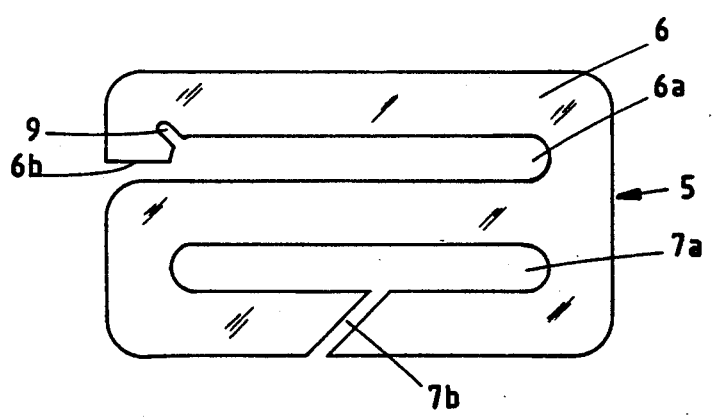
Figure 3A:
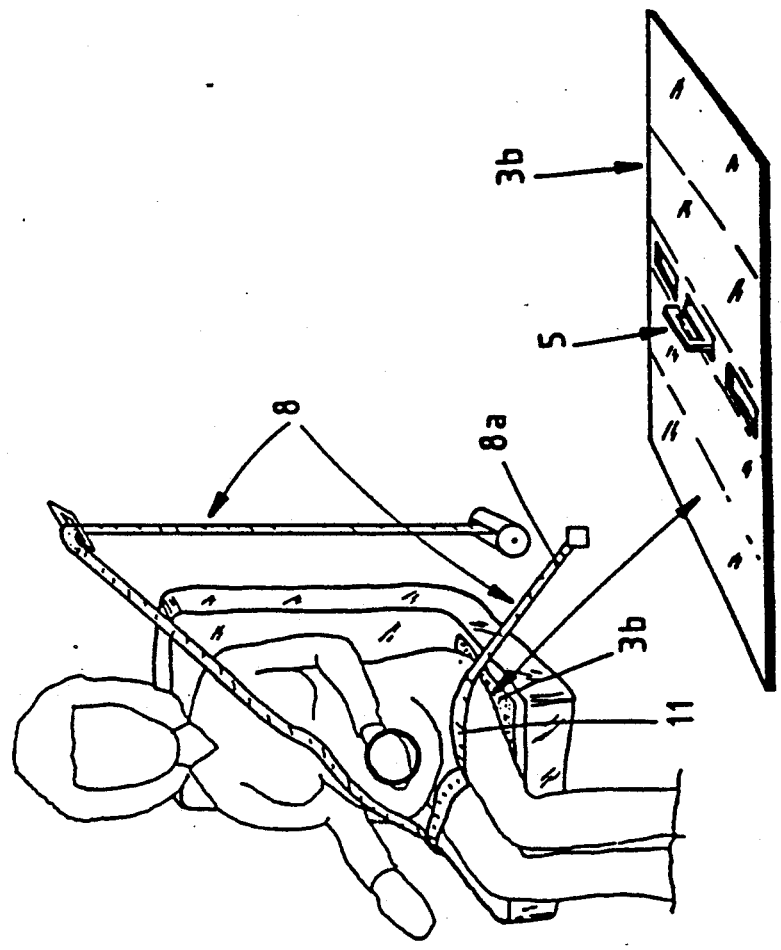
Figure 3B:
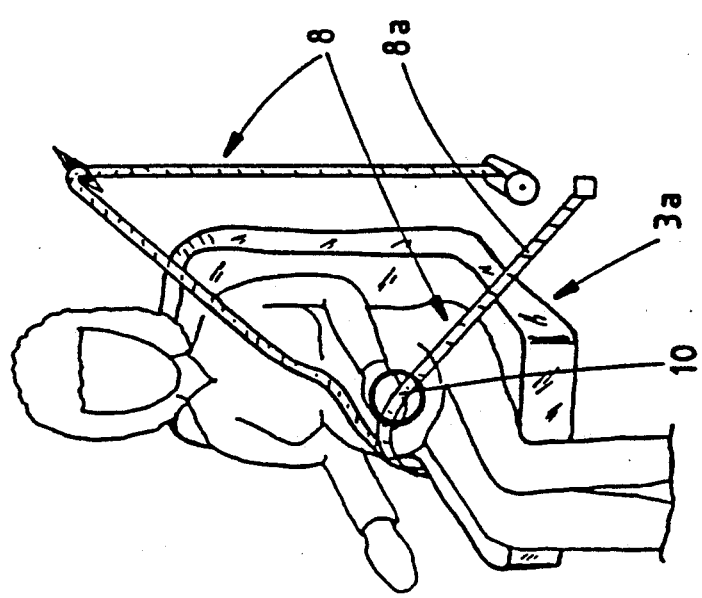
Figure 4:
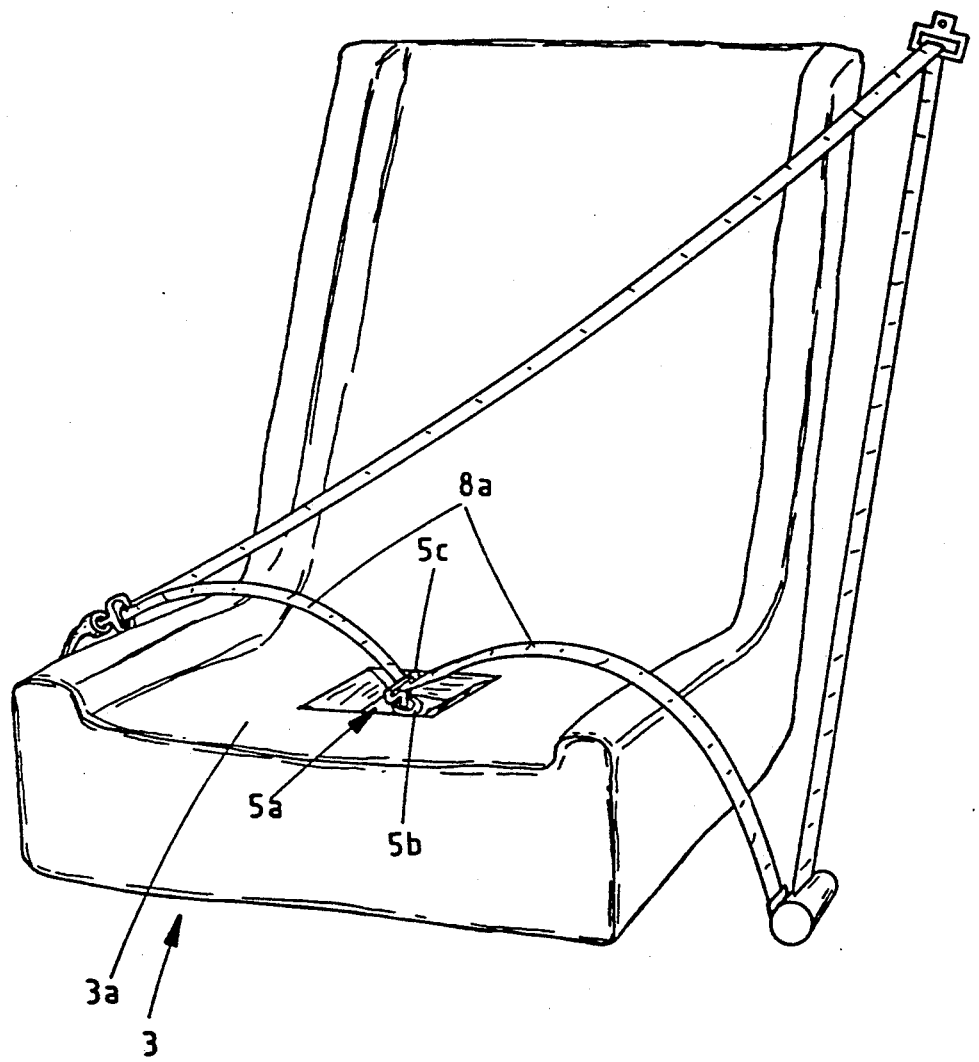
Figure 5:
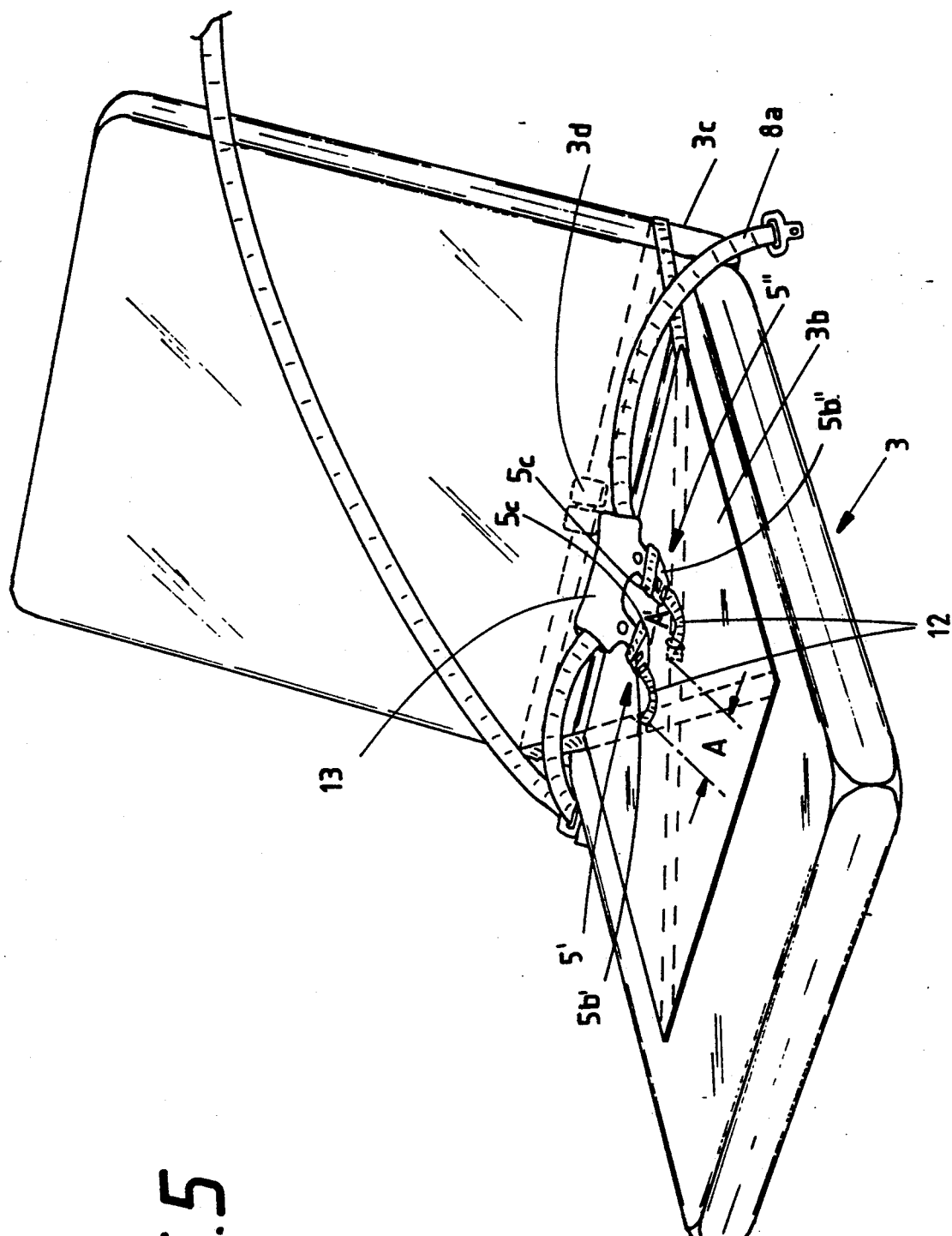

The invention is disclosed in more detail below with reference to some embodiments of the invention which are shown in the enclosed drawings, in which FIG. 1 shows a sitting support in the form of a flat flexible seat cushion to be loosely placed on the seat portion of a car seat, FIG. 2 shows a connecting means in the form of a buckle, FIG. 3a shows a three-point safety belt in use, indicating how its transverse belt may slide up to the user's abdomen in case of braking, FIG. 3b shows the same, but with the transveral belt fastened to the sitting support between the user's thighs, FIG. 4 is a view in perspective showing a car seat with a three-point safety belt, in which the transverse belt is fastened to the seat portion of the car seat by the aid of a releasable snap connection, and FIG. 5 is a view in perspective of a car seat with a three-point safety belt the transverse belt of which is fastened by the aid of a releasable snap connection to a seat cushion which is placed on the seat portion of the car seat.

FIG. 3a is a perspective view of a pregnant woman who is sitting on a car seat and is safeguarded by a three-point safety belt. The transverse portion of the safety belt 8, transverse belt 8a, which in a normal position lies in loose contact across the user's thighs, is shown in a position after sliding up onto the woman's abdomen and womb, which is indicated by arrow 10.

This dangerous situation occurring as a result of rapid braking or in case of a car crash may be prevented, as shown in FIG. 3b, in which transverse belt 8a is fastened to the sitting support, in the present case shown to be a seat cushion 3b, by the aid of a connecting means—not visible.

In an embodiment of the invention and as shown in FIG. 4, transverse belt 8a of the safety belt 8 is provided with a connecting means 5 in the shape of a releasable snap connection 5a, with female element 5b of the snap connection means fastened in seat portion 3a of the car seat and with male element 5c being slidably fastened to transversal belt 8a.

In use, the safety belt is secured in a conventional manner by the aid of connecting means to a stationary point in the car, where upon male element 5c on transverse belt 8a is connected with female element 5b.

In another embodiment of the invention as shown in FIG. 1, transverse belt 8a is by the aid of connecting means 5 fastened to a seat support 3 consisting of a flat flexible seat cushion 3b to be placed loosely on the seat portion 3a of the car seat.

Connecting means 5 is in this case shown to be a buckle comprising a slot shaped opening 7a with an oblique insertion slot 7b at one longitudinal side to be inserted in a loop 2a on seat cushion 3b, which is disclosed in more detail below. Said buckle also comprises a hook-shaped portion 6 limiting a second slot opening 6a, which is substantially parallel with first mentioned slot-shaped opening 7a and has a narrow hook-shaped opening 6b at one end of slot 6a for insertion and removal of transverse belt 8a.

A short groove 9 is provided in the hook-shaped portion 6 close to hook opening 6b, said groove extending obliquely from the end of slot opening 6a at an acute angle with the inlet/outlet direction of narrow hook opening 6b.

Seat cushion 3b, as shown in FIG. 1, Is flexible and may be folded or rolled up. Seat cushion 3b, consequently, requires little space for transport or storage.

The above mentioned loop 2a on seat cushion 3b is preferably provided at its central portion.

Seat cushion 3b preferably consists of a soft and insulating material of great strength and resistance to tearing, and the above mentioned loop 2a, which preferably consists of a band 2 is stitched to the top face of seat cushion 3b.

The metal buckle constituting connecting means 5 is arranged with hook opening 6b of slot opening 6a facing the user, i.e. away from the direction of travel, and is attached to one of the transverse nylon bands 2, said band being Inserted in the oblique inlet slot 7b in the lower portion of the buckle and into slot opening 7a. Transverse belt 8a of safety belt 8 is inserted into buckle opening 6b in such a manner that the front edge of transverse belt 8 is placed in groove 9 in the upper buckle portion, so that the edge of the safety belt is rounded towards the user's inguinal area 11.

It will appear from the above mentioned that when transverse belt 8a of safety belt 8 is connected with seat support 3 by the aid of connecting means 5 said belt portion will extend across the user's thighs. This is contrary to safety belts the transverse belt 8a of which is not fastened and may slide up towards the abdomen area of the user in case of rapid braking, in which case It may cause injure to internal organs, e.g. the womb 10 of pregnant women.

The device according to the invention may be used in front seats as well as back seats in cars provided with safety belts. Seat cushion 3b is loosely placed on the seat and is kept down towards the car seat 3 by the weight of the user in a critical situation of braking or a car crash when the influence of forces occurs. As mentioned, said cushion is lightweight and foldable.

In order to ensure that seat cushion 3b does not slide forwards on seat 3 in common use and, especially, in case of braking or a car crash, seat cushion 3b is provided with a fastening strap 3c with connecting means 3d, as shown in FIG. 5. The ends of fastening strap 3c extend from two rear corners of seat cushion 3b. Fastening straps 3c are intended to extend behind the back rest of the seat when in use. By the aid of said connecting means of fastening strap 3c the latter can readily be placed around the back rest and fastened, and released, respectively.

To provide further safety against the transverse belt 8a moving up onto the user's abdomen, the central portion of seat cushion 3b is provided with two resilient bands 12, which are fastened at a mutual distance A across the seat cushion. The other pair of ends of band 12 are in the embodiment shown in FIG. 5 connected with two female elements 5b', 5b'' of snap connection 5', 5'' cooperating with corresponding male elements 5c', 5c'', which are secured at a mutual distance A' to a fastening means 13 which is releasably hooked across and slidable on transverse belt 8a. Obviously, female and male elements 5b, 5c of connecting means 5 may be fastened in a manner vice versa of the above mentioned.

Said fastening means 13 may consist of a sleeve with a longitudinal slot to be provided on the transverse belt 8a, and it may be provided with suitable fastening members to prevent it from unintended removal from transverse belt 8a. Said fastening means 13 may thus also comprise a suitable flexible material provided with hook and loop fasteners or snap fasteners at both opposite ends, which are made to cooperate when the fastening means is in place on transverse belt 8a. Said fastening means 13 is, furthermore, provided with suitable fastening elements for the above mentioned female, and male elements 5b,5c, respectively of connecting means 5.

Fastening means 13 and its connection with connecting means 5, which either comprise one connecting means or two connecting means 5', 5'' for cooperation with female and male elements 5b, 5c, respectively, on bands 12 may be designed in various manners which are all within the scope of the following claims.

I claim:

1. An automobile seat belt assembly which comprises a transverse belt which in normal position lies in loose contact across the user's thighs, a flat flexible seat cushion adapted to rest removably on a seat of the automobile, and connecting means extending between a central portion of the transverse belt and secured to the flexible seat cushion between the user's thighs.

2. A seat belt assembly as claimed in claim 1, further comprising a fastening strap with connecting means extending from both rear corners of said seat cushion and adapted to extend behind the backrest of an automotive seat to secure said seat cushion in place.

3. A seat belt assembly as claimed in claim 1, said connecting means being connected with a central portion of said flat seat cushion via two resilient bands each secured at one end to the seat cushion at a distance apart and at the other end at a mutual distance to connecting means slidable on and releasably fastened to said transverse belt.

4. A seat belt assembly as claimed in claim 3, said connected means comprising a female element fastened to said connecting means which is releasably hooked across said transverse belt, said connecting means also comprising a male element fastened to said bands.

5. A seat belt assembly as claimed in claim 4, said connecting means comprising two connecting members having male elements which are fastened at said mutual distance between said bands to said fastening means on said transverse belt for cooperation with said female elements of said connecting means on said bands.

6. A seat belt assembly for an automobile seat, comprising a shoulder strap which extends diagonally downward from one side of the seat to a point of retention at the other side of the seat, a transverse belt which extends from adjacent said point of retention across the seat to a point of securement on the other side of the seat, said transverse belt being free from securement to any member intermediate the length of said transverse belt which would prevent downward movement of said transverse belt, and connecting means connected to and extending downwardly from an intermediate portion of said transverse belt and limiting upward movement of said intermediate portion of said transverse belt, said connecting means being secured to a flat flexible seat cushion adapted to rest removably on the automobile seat.

7. A seat belt assembly as claimed in claim 6, and means preventing forward movement of said flat flexible seat cushion relative to said seat.

8. A seat belt assembly as claimed in claim 7, said preventing means comprising straps extending from rear corners of said flexible seat cushion about a backrest of the seat.

* * * * *